(12) United States Patent
Azuma

(10) Patent No.: US 7,889,887 B2
(45) Date of Patent: Feb. 15, 2011

(54) LANE RECOGNITION APPARATUS

(75) Inventor: Takahiro Azuma, Yokohama (JP)

(73) Assignee: Honda Elesys Co., Ltd., Hodogaya-Ku, Yokohama-Shi, Kanagawa-Ken (JP)

( * ) Notice: Subject to any disclaimer, the term of this patent is extended or adjusted under 35 U.S.C. 154(b) by 946 days.

(21) Appl. No.: 11/376,101

(22) Filed: Mar. 16, 2006

(65) Prior Publication Data

US 2006/0210116 A1 Sep. 21, 2006

(30) Foreign Application Priority Data

Mar. 18, 2005 (JP) .............................. 2005-078988

(51) Int. Cl.
*G06K 9/00* (2006.01)

(52) U.S. Cl. ..................................... 382/104

(58) Field of Classification Search ................ 382/104, 382/274, 170, 106; 348/148, 143
See application file for complete search history.

(56) References Cited

U.S. PATENT DOCUMENTS

| | | | |
|---|---|---|---|
| 7,362,883 B2* | 4/2008 | Otsuka et al. ............... | 382/104 |
| 2003/0016287 A1* | 1/2003 | Nakayama et al. .......... | 348/148 |
| 2003/0026456 A1* | 2/2003 | Akutagawa ................. | 382/104 |

FOREIGN PATENT DOCUMENTS

| | | |
|---|---|---|
| JP | 03268111 A | 11/1991 |
| JP | 9-259287 | 10/1997 |
| JP | 09-330416 A | 12/1997 |
| JP | 2001236506 A | 8/2001 |
| JP | 2004-259128 A | 9/2004 |
| JP | 2004310522 A | 11/2004 |

OTHER PUBLICATIONS

McDonald et al, "Application of the Hough Transform to Lane Detection in Motorway Driving Scenarios." Proceedings of the Irish Signals and Systems Conference, 2001.
Japanese Office Action, Japanese Patent Application No. 2005-078988, Drafted: May 28, 2010, Mailing Date: Jun. 1, 2010, pp. 1-2, English Translation: pp. 1-2.
Notice of Allowance, Japanese Patent Application No. 2005-078988, Drafted: Nov. 12, 2010, Mailing Date: Nov. 16, 2010, pp. 1-3, English Translation: pp. 1-3.

* cited by examiner

*Primary Examiner*—Vu Le
*Assistant Examiner*—Claire Wang
(74) *Attorney, Agent, or Firm*—Squire, Sanders & Dempsey (US) LLP

(57) ABSTRACT

A lane recognition apparatus that recognizes a lane from an input image sequence captured from a visual sensor mounted on a vehicle at a fixed time interval, includes a time series smoothing part for generating a smoothed feature image based on a feature image extracted from the input image sequence so that a dotted line lane boundary describes a linear locus over time, a gradient image generation part for generating a gradient image by estimating a feature value gradient at each pixel position of the smoothed feature image, and a Hough transform part for performing Hough transform on the gradient image and detecting lines of edges in the smoothed feature image.

10 Claims, 5 Drawing Sheets

LANE RECOGNITION APPARATUS

BACKGROUND OF THE INVENTION

1. Field of the Invention

The present invention relates to a lane recognition apparatus suitable for recognizing a lane from input images captured from a visual sensor mounted on a vehicle at a fixed time interval, in particular, for recognizing dotted line lane boundaries, etc.

Priority is claimed on Japanese Patent Application No. 2005-078988, filed Mar. 18, 2005, the content of which is incorporated herein by reference.

2. Description of Related Art

An apparatus is known which recognizes lane boundaries marked on a road surface or lane markers buried in a road surface from a visual sensor mounted on a vehicle to detect the position and the direction of the driver's vehicle. For example, a forward vehicle recognition apparatus is disclosed which includes: a white line preprocessing part for extracting edges in an input image; a white line recognition part for recognizing solid white lines of a traveling lane; a preprocessing part for extracting edges after time series smoothing of the input image; and a forward vehicle recognition part for recognizing a forward vehicle, in order to reduce the computational cost in image processing (see Japanese Unexamined Patent Application, First Publication No. H09-259287 (reference 1)).

Furthermore, a Hough transform method for lane detection is known which performs time series smoothing, mixing an output at the preceding time with an input at a rate $(\alpha)(\tau(i)=\alpha x(i)+(1-\alpha)\tau(i-1)$ $\tau$: output x: input i: time), and detecting a lane (see J. McDonald, J. Franz and R. Shorten. Application of the Hough Transform to Lane Detection in Motorway Driving Scenarios. Proceedings of the Irish Signals and Systems Conference, 2001 (reference 2)).

According to the art disclosed in the above-described reference 1, time series smoothing is performed before detection of lines. However, the accurate smoothing method is not disclosed therein, and the art relies the line detection on the weighing the detection results from the far side based on the detection outcomes from the near side. Therefore, detection of dotted line lane boundaries is considered to be impossible.

Furthermore, the detection possibility of dotted line lane boundaries is not disclosed in the above-described reference 2. While the detection may be possible to a certain degree, detection performance is considered to be low due to the art's assumption that a boundary marking is continuous throughout image sections aligned from near to far.

SUMMARY OF THE INVENTION

In view of the above problems, the present invention was made, and it is the object of the present invention to provide a lane recognition apparatus capable of detecting lane boundaries including dotted line lane boundaries and of reducing the computational cost and of increased recognition robustness.

In order to solve the above-described problems, the present invention provides a lane recognition apparatus that recognizes a lane from an input image sequence captured from a visual sensor mounted on a vehicle at a fixed time interval, including a time series smoothing part for generating a smoothed feature image based on a feature image extracted from the captured image sequence so that a dotted line lane boundary describes a linear locus over time; a gradient image generation part for generating a gradient image by estimating a feature value gradient at each pixel position in the smoothed feature image, and a Hough transform part for performing Hough transform on the gradient image and detecting edges in the smoothed feature image.

Furthermore, the lane recognition apparatus of the present invention includes an inverse perspective projection part for projecting an image on a plane coordinate system that approximates the road surface in accordance with the optical model of a sensor and supplying the image sequence to the time series smoothing part.

Furthermore, the lane recognition apparatus of the present invention includes a feature image extraction part for extracting the feature image indicating likelihood of the lane boundary by a feature value based on the peripheral pixels at each pixel position of the road surface projection image and supplying the feature image to the time series smoothing part.

Furthermore, in the lane recognition apparatus of the present invention, the time series smoothing part mixes a feature image extracted at a certain time into the smoothed feature image at the preceding time at a predetermined rate for updating the smoothed feature image to obtain a smoothed feature image smoothed in time series.

Furthermore, in the lane recognition apparatus of the present invention, the time series smoothing part further adds a predetermined arithmetic formula having predetermined spatial frequency response in generating the smoothed feature image so as to emphasize and to extract dotted line lane boundaries which describe linear loci over time.

According to the present invention, a dotted line lane boundary can be detected, which describes an apparent linear locus over time though the dotted line lane boundary may not form a prominent line in the input image at a certain point in time, by extraction of a dotted line that form a linear locus over time in a smoothed feature image extracted from a captured image sequence.

Furthermore, the lane recognition apparatus of the present invention adds the pixel value of each pixel of the extracted feature image to the corresponding pixel value in a smoothed feature image at a certain time at a predetermined rate for updating the smoothed feature image to obtain a smoothed feature image smoothed in time series, and therefore keeps lane boundary positions while the lane is momentarily unrecognizable on entering tunnel, etc., as a pixel value indicating the likelihood of boundary presence, thereby having an effect of reducing frequency or time when the lane boundary position becomes undetected.

Regarding an input image, the resolution of a short-range view is generally finer than required so that the resolution requirement of a long-range view is ensured. However, a lane recognition apparatus of the present invention can reduce the computational cost by converting an image to a road surface plane coordinate for processing of the image in comparison with the computational cost of applying a computationally intensive process such as Hough transform directly on the input image or an input image subjected to smoothing processing, thereby reducing the processing load on a CPU (Central Processing Unit).

DETAILED DESCRIPTION OF THE INVENTION

Figure 1:
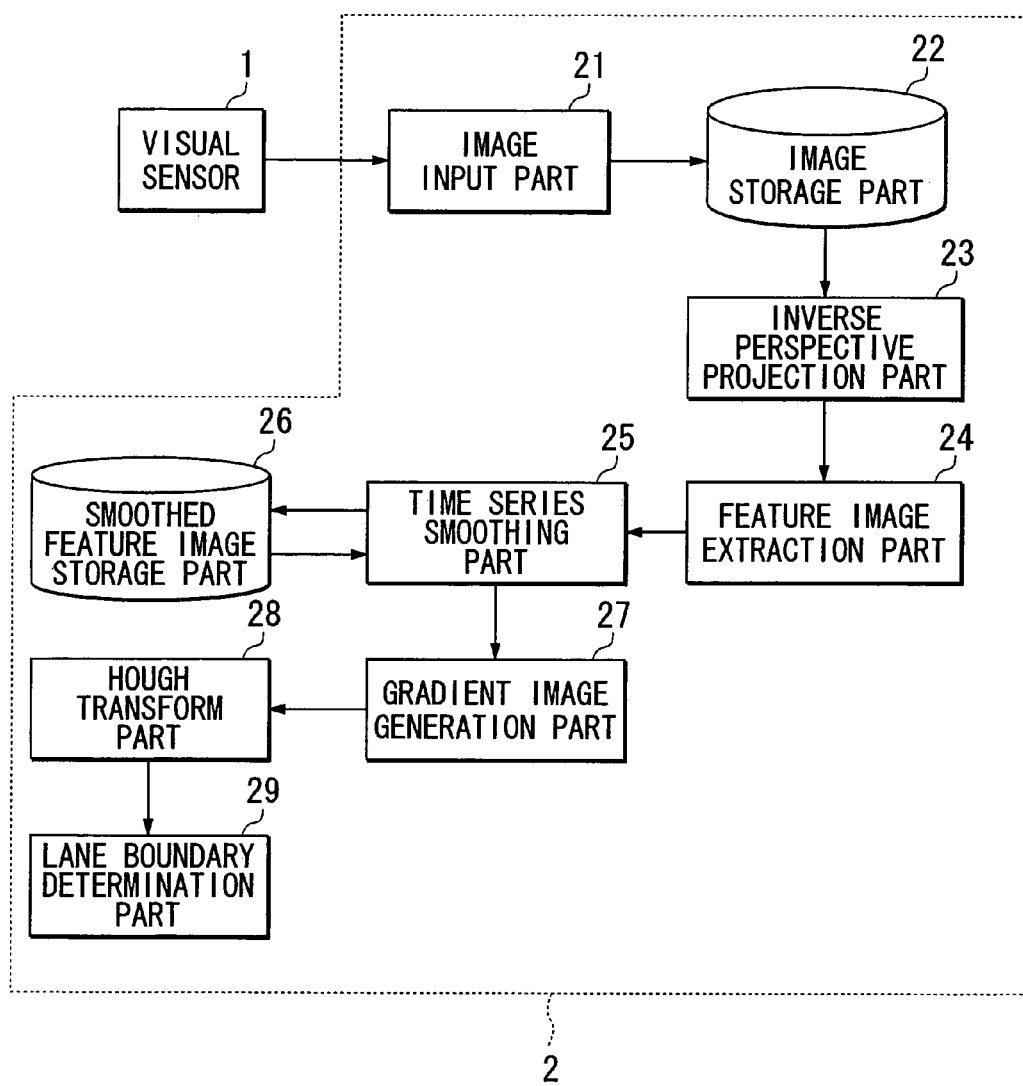
FIG. 1 is a block diagram showing an internal structure of a lane recognition apparatus according to an embodiment of the present invention.

FIG. 1 is a block diagram showing an internal structure of a lane recognition apparatus according to an embodiment of the present invention.

A lane recognition apparatus 2 of the present invention is constituted by an image input part 21, an image storage part 22, an inverse perspective projection part 23, a feature image extraction part 24, a time series smoothing part 25, a smoothed feature image storage part 26, a gradient image generation part 27, a Hough transform part 28 and a lane boundary determination part 29.

The image input part 21 captures an image photographed by a visual sensor 1 such as a CCD (Charge-Coupled Device) camera mounted on a vehicle in time series to store the input image in the image storage part 22. The inverse perspective projection part 23 projects the time series image stored in the image storage part 22 on a plane coordinate system approximating a road surface in accordance with the optical model of a sensor to supply the time series image to the time series smoothing part 25.

The feature image extraction part 24 extracts a feature image with each pixel value indicating the likelihood of presence of a lane boundary comprised of lane markers based on the peripheral pixel values at each pixel position in the road surface projection image to supply the feature image to the time series smoothing part 25. The time series smoothing part 25 reveals the traces of lines including dotted lines, which describe linear loci over time, based on the feature image extracted from the captured time series input image. At this time, the smoothed feature image storage part 26 holds the latest smoothed feature image and having it accessible to the time series smoothing part 25.

On the other hand, the gradient image generation part 27 obtains a feature value gradient at each pixel position in the smoothed feature image by estimation to generate and supply a gradient image to the Hough transform part 28. The Hough transform part 28 performs the Hough transform of the gradient image to detect and supply line-shaped edges in the smoothed feature image to the lane boundary determination part 29. The lane boundary determination part 29 selects lane boundary candidates from a Hough image to determine the traveling lane position and direction.

The above-described image input part 21, image storage part 22, inverse perspective projection part 23, feature image extraction part 24, time series smoothing part 25, smoothed feature image storage part 26, gradient image generation part 27, Hough transform part 28 and lane boundary determination part 29 may be respectively constituted by an application specific LSI (Large Scale Integrated Circuit) or implemented with a CPU.

Figure 2:
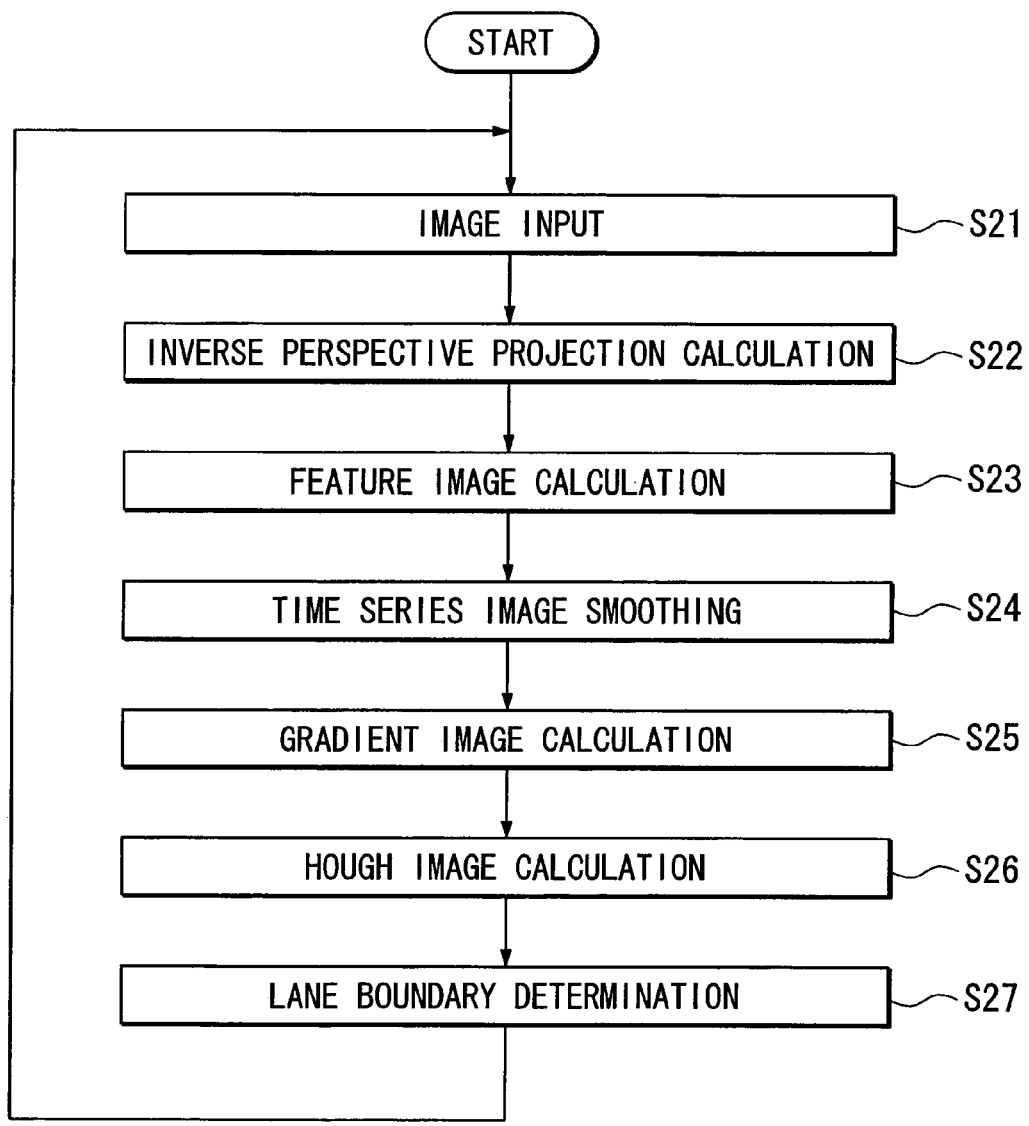
FIG. 2 is a flowchart cited for explaining operation according to the embodiment of the present invention.

FIG. 2 is a flowchart cited for explaining operation according to the embodiment of the present invention shown in FIG. 1. Each of FIG. 3 through FIG. 7 is a view showing an example of an image generated in each step according to the embodiment of the present invention.

The operation according to the embodiment of the present invention shown in FIG. 1 will be explained in detail with reference to FIG. 2 through FIG. 7.

First, the lane recognition apparatus 2 obtains photographed images from the visual sensor 1 via the image input part 21 repeatedly at a fixed time interval (S21). The obtained image is represented hereinafter as a map m(t, x, y) from time and a two-dimensional coordinate to a pixel value. Here, t represents time of which the unit is arbitrary and (x, y) represents a two-dimensional coordinate in the image, that is, a position in view of the visual sensor 1. A pixel value is a vector of one or more dimensions of integer numbers or real numbers and typically represents quantized visual characteristics such as brightness and color at a position (x, y) in the view.

Figure 3:
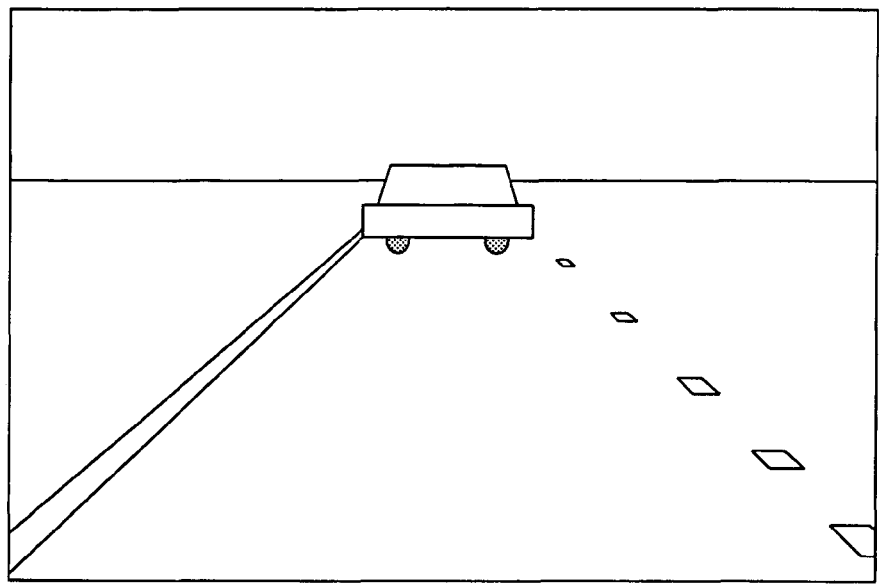
FIG. 3 is a view showing an example of images generated in each step in the operation of the embodiment of the present invention.

An image obtained at the time t is held by the image storage part 22. In addition, the whole image does not have to be held at the same time. However, for brevity of explanation, the all information of each type of image is considered to be available hereinafter, unless otherwise noted. An image obtained from the visual sensor 1 is referred to as an input image hereinafter so as to be distinguished from a processed image. FIG. 3 shows an example of the input image.

Next, the inverse perspective projection part 23 assumes each pixel value in the input image to be an observation of the light reflected from the road surface approximated by a plane and accordingly it projects the image to the road surface plane coordinate system at a necessary resolution and by covering a necessary range (S22). An equivalent result can be obtained without this projection by changing the processing parameters at the long-range view and short-range view in the succeeding processing. However, when the increase in the computational cost by the parameterization exceeds the computational cost of the above-described image projection, employing the image projection by the inverse perspective projection part 23 is recommended.

Figure 4:
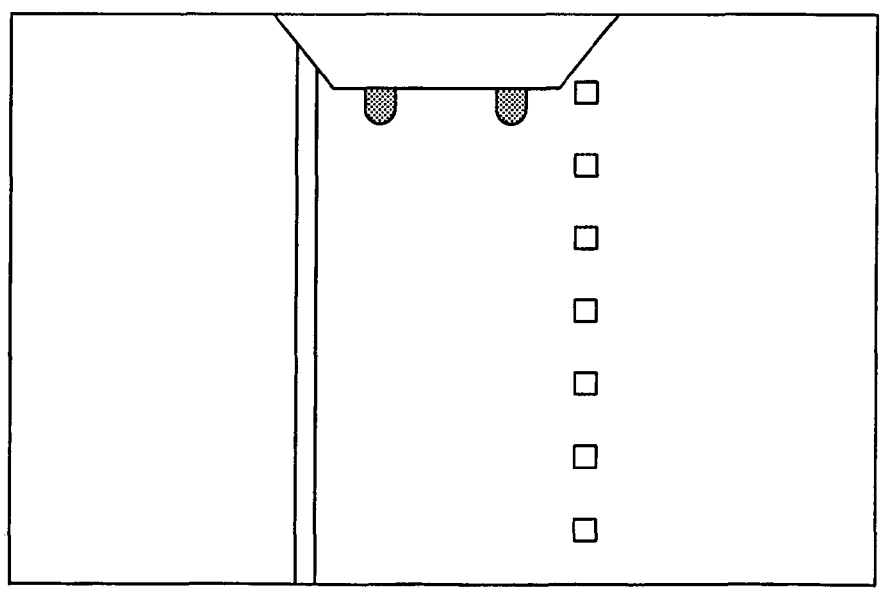
FIG. 4 is a view showing an example of images generated in each step in the operation of the embodiment of the present invention.

The coordinate system of the road surface projection image is set, for example, in such a way that a direction orthogonal to the optical axis of the visual sensor on a road surface plane is defined as an x-axis, the optical axis direction projected on the road surface plane is defined as a y-axis and the intersection point of a perpendicular line dropped from the focus of the camera and the road surface plane is defined as an origin. FIG. 4 shows an example of a road surface plane image.

The feature image extraction part 24 takes the pixel values of the periphery of each position of the road surface projection image as the input to a image filter, which outputs a real number value or an integral number value indicating the positions where the likelihood of the existence of the lane marker such as a white line is high (S23). A convolution filter, a pattern correlation filter, a top hat filter, a filter which calculates the difference between the median value of a large area and the median value of a small area, a neural network, etc., are the examples of the filter.

Figure 5:
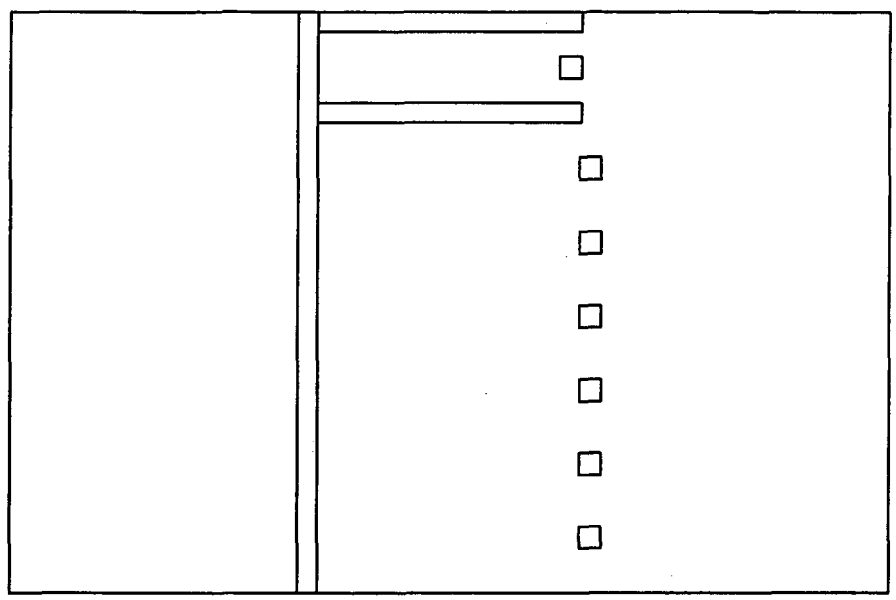
FIG. 5 is a view showing an example of images generated in each step in the operation of the embodiment of the present invention.
Figure 6:
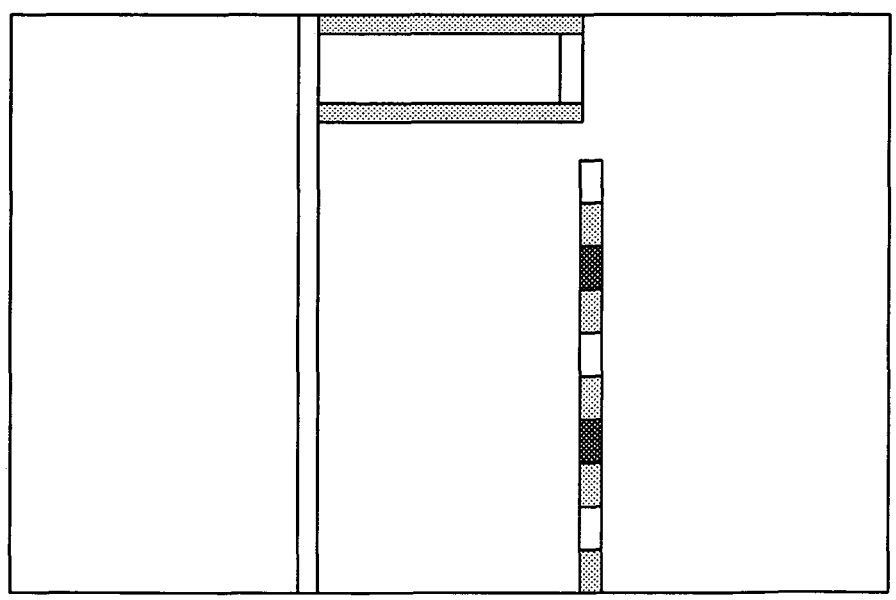
FIG. 6 is a view showing an example of images generated in each step in the operation of the embodiment of the present invention.

A map f(t, x, y) which denotes the output value at each pixel position (x, y) of the above-described filter is referred to as a feature image hereinafter, and the value of f(t, x, y) at a specific time t and a specific pixel coordinate (x, y) is referred to as a feature value hereinafter. FIG. 5 shows an example of a feature image.

On the other hand, the time series smoothing part 25 employs a time series image filter here. The relationship between a smoothed feature image R at time t and a smoothed feature image R at time t+1 is defined by the following recurrence formula (1). Moreover, it is assumed that R(0, x, y) is equal to f(0, x, y).

$$R(t+1,x,y)=\alpha\beta f(t,x,y)+\alpha(1-\beta)R(t,x,y)+\gamma f(t,x,y-1)+\sigma f(t,x,y-2)+\epsilon R(t,x,y-1)+\lambda R(t,x,y-2) \quad (1)$$

Here, update of R is sequentially performed along the increment direction of y. Thus, the sum of the third and following terms can have spatial frequency response effect. The coefficient β is a real number from 0 to 1 and is determined so that a dashed line or dotted line lane boundary marker describes a suitable locus in accordance with a vehicle speed. On the other hand, the coefficients α, γ, σ, ϵ and λ are calculated based on the dot interval ω (pixel/cycle) desired to be detected and the pass band frequency μ (cycle/pixel) in accordance with a coefficient calculation method of a common IIR (Infinite Impulse Response) band-pass filter. The period ω and width μ depend on a lane standard and do not change during the regular operation of the apparatus so that the coefficients other than the coefficient β in the above formula can be considered as constants.

The coefficient β is a real number from 0 to 1. When the coefficient α is disregarded, the first and second term constitute a time series smoothing filter. At this time, the length of the impulse response can be changed by a value of the coefficient β, and the value of the coefficient β can be controlled based on an input from a speed sensor or yaw sensor where those sensors are available. The coefficients α, γ, σ, ϵ and λ are calculated by the following formulae, etc. A symbol * in the following formulae explicitly indicates an multiplication, while the multiplication symbol may be omitted where it is obvious.

First, the constants P and K are obtained by the following formulae using the ω and μ.

$$P = 1 - 3\mu$$

$$K = 1 - (2P)^* \cos(2\pi/\omega) + R^* R$$

Second, each coefficient is obtained using the P and K as below.

$$\alpha = 1 - K$$

$$\gamma = 2(K-P)^* \cos(2\pi/\omega)$$

$$\sigma = P^*P - K$$

$$\epsilon = 2P^* \cos(2\pi/\omega)$$

$$\lambda = -P^*P$$

The recurrence formula has the effect of revealing the loci of dashed lines or dotted lines by the time series smoothing effect of the first and the second terms. Furthermore, the formula has the effect that weakens the signal of a linear pattern largely deviating from a traveling direction. The signal of a dotted line boundary, in which the markers are arranged at a fixed interval, can be strengthened owing to a spatial band pass effect by addition of the third and following terms. The trace a dotted line, and therefore the lane boundary can be more reliably detected.

Next, the gradient image generation part 27 estimates a feature value gradient (Gx, Gy) at each pixel position in the feature image f (S25) and represents the gradient image as G(t,x,y). For example, the estimation of the gradient can be obtained by the following arithmetic formulae (2) and (3).

$$Gx = \Sigma[\{f(t,x+h,y)-f(t,x-h,y)\}/(2h)] \quad (2)$$

The sum of h=1, 2, 3

$$Gy = \Sigma[\{f(t,x,y+v)-f(t,x,y-v)\}/(2v)] \quad (3)$$

The sum of v=1, 2, 3

Next, the Hough image transform part 28 performs Hough image transform processing, more specifically, performs line Hough transform of the gradient image in order to detect edges in the feature image (S26). An edge is a place where pixels having large magnitude of feature value gradients align. Accordingly, a gradient direction, θ=arctan(Gy/Gx), is obtained to the pixel G(t, x, y) at which the gradient magnitude is greater than a certain threshold, and regarding a line passing through the point (x, y) with the line normal being parallel to the gradient direction, the distance from the origin to this line is obtained as ρ=x*cos(θ)+y*sin(θ).

Pixels on a line with gradient directions being parallel to the line normal have the same (ρ, θ). By counting the number of pixels that are likely to be the constituents of the line represented by a given (ρ, θ) and refer to the count as frequency, (ρ, θ), of which the frequency is high, corresponds to a salient line in the gradient image.

Figure 7:
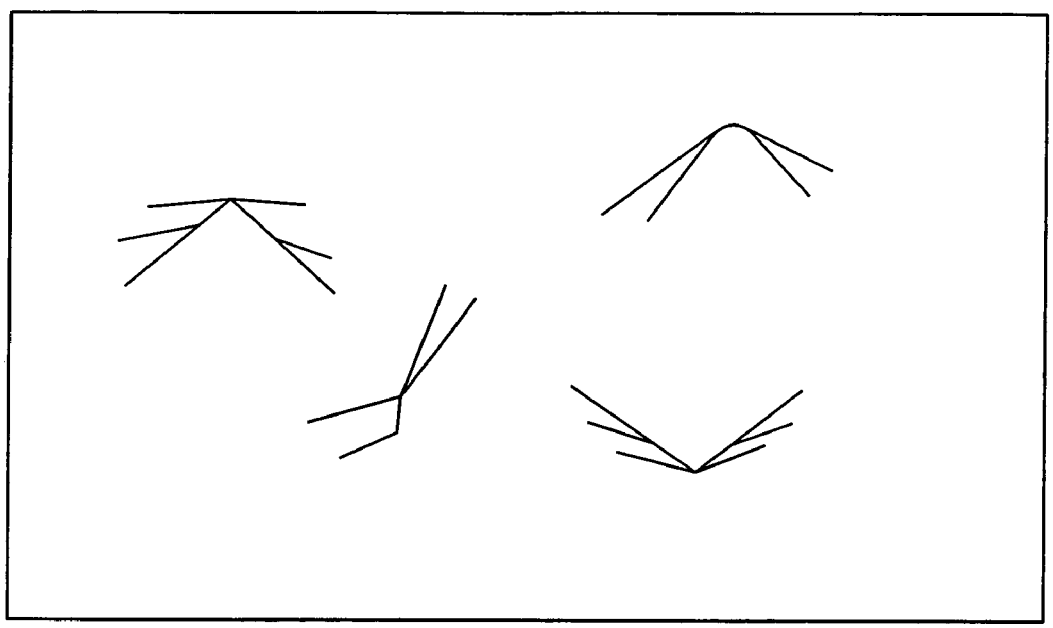
FIG. 7 is a view showing an example of images generated in each step in the operation of the embodiment of the present invention.

For calculating the frequency, each range of values of ρ and θ is suitably made quantized, a table representing a map H(t, ρ, θ) from (t, ρ, θ) to the frequency is created on the memory and the number of pixels corresponding to the given (ρ, θ) is counted. At this time, the direction θ of the gradient regarding each pixel of the feature image is changed within a certain width while considering an error of pixel value gradient so that ρ is obtained. The map H(t, ρ, θ) is referred to as a Hough estimation image hereinafter. FIG. 7 shows an example of the Hough estimation image.

Finally, lane boundary determination is performed by the lane boundary determination part 29 (S27). In this step, (ρ, θ) value pairs of which an estimation frequency value is high in a Hough estimation value image are made the lane boundary candidates. The most likely candidates are selected out of the boundary candidates by knowledge about the lane boundary standard so that a lane position and direction are determined. A more detailed explanation of the lane boundary determination processing will be omitted because the lane boundary determination processing is out of the scope of the present invention.

As explained above, the lane recognition apparatus 2 of the present invention extracts solid line boundaries as well as dotted line lane boundaries which describes the linear locus over time based on the smoothed feature image extracted from the input image sequence captured via the visual sensor 1, and thus can reliably detect the lane boundary such as a lane marker which describes an apparent linear locus over time though the lane boundary is not detected as a line at a certain point of time.

Furthermore, the lane recognition apparatus 2 adds a pixel value of a corresponding pixel of the extracted feature image to each pixel value of a smoothed feature image at a certain time at a predetermined rate for updating the smoothed feature image, and therefore keeps the lane boundary positions, while the lane is momentarily unrecognizable on entering a tunnel, etc., as an existence likelihood distribution, thereby having an effect of reducing frequency or time when the lane boundary position become undetected.

Regarding an input image, the resolution of a short-range view is generally finer than required so that the resolution requirement of a long-range view is ensured. However, a lane recognition apparatus of the present invention can reduce the computational cost by converting an image to a road surface plane coordinate in the optimal resolution for processing of the image in comparison with the computational cost of applying a computationally intensive process such as Hough transform directly to the input image or an image subjected to smoothing processing, thereby reducing the processing load on a CPU.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A lane recognition apparatus that recognizes a dashed or dotted line lane boundary from an input image sequence captured from a visual sensor mounted on a vehicle at a fixed time interval, comprising:
    a time series smoothing part configured to generate a smoothed feature image based on a feature image extracted from the input image sequence such that a dashed or dotted line lane boundary describes a linear locus over time;
    a gradient image generation part configured to generate a gradient image by estimating a feature value gradient at each pixel position of the smoothed feature image;
    a Hough transform part configured to perform a Hough transform on the gradient image and to detect lines of edges in the smoothed feature image, wherein the time series smoothing part, the gradient image generation part, and the Hough transform part are implemented by at least one of a large scale integrated circuit or a CPU; and
    a feature image extraction part configured to extract the feature image indicating a likelihood of the lane boundary by a feature value based on peripheral pixels at each pixel position of a projection image of a road surface and to supply the feature image to the time series smoothing part,
    wherein the feature image extraction part takes pixel values of periphery of each position of a road surface projection image as an input to an image filter, which outputs a real number value or an integral number value indicating positions where a likelihood of existence of a lane marker such as a white line is high.

2. A lane recognition apparatus according to claim 1, further comprising:
    an inverse perspective projection part configured to project each image of the input image sequence on a plane coordinate system that approximates the road surface in accordance with an optical model of a sensor and to supply the projection image of the road surface to the time series smoothing part.

3. A lane recognition apparatus according to claim 1, wherein the time series smoothing part is configured to add the feature image at a certain time into the smoothed feature image at the preceding time at a predetermined rate to update the smoothed feature image to obtain a smoothed feature image smoothed in time series.

4. A lane recognition apparatus according to claim 3, wherein the time series smoothing part is further configured to add a predetermined arithmetic formula having a spatial frequency response to the smoothed feature image in order to emphasize a dashed or dotted line lane boundary that describes a linear locus over time.

5. A lane recognition apparatus that recognizes a dashed or dotted line lane boundary from an input image sequence captured from a visual sensor mounted on a vehicle at a fixed time interval, comprising:
    time series smoothing means for generating a smoothed feature image based on a feature image extracted from the input image sequence such that a dashed or dotted line lane boundary describes a linear locus over time;
    gradient image generation means for generating a gradient image by estimating a feature value gradient at each pixel position of the smoothed feature image; and
    Hough transform means for performing a Hough transform on the gradient image and to detect lines of edges in the smoothed feature image; and
    feature image extraction means for extracting the feature image indicating a likelihood of the lane boundary by a feature value based on peripheral pixels at each pixel position of a projection image of a road surface and to supply the feature image to the time series smoothing means,
    wherein the feature image extraction means takes pixel values of periphery of each position of a road surface projection image as an input to an image filter, which outputs a real number value or an integral number value indicating positions where a likelihood of existence of a lane marker such as a white line is high.

6. A lane recognition apparatus according to claim 5, further comprising:
    inverse perspective projection means for projecting each image of the input image sequence on a plane coordinate system that approximates the road surface in accordance with an optical model of a sensor and to supply the projection image of the road surface to the time series smoothing means.

7. A lane recognition apparatus according to claim 5, wherein the time series smoothing means is configured to add the feature image at a certain time into the smoothed feature image at the preceding time at a predetermined rate to update the smoothed feature image to obtain a smoothed feature image smoothed in time series.

8. A lane recognition apparatus according to claim 7, wherein the time series smoothing means is further configured to add a predetermined arithmetic formula having a spatial frequency response to the smoothed feature image in order to emphasize a dashed or dotted line lane boundary that describes a linear locus over time.

9. A lane recognition apparatus according to claim 1, wherein the time series smoothing part is configured to perform time series smoothing such that a signal of a linear pattern largely deviating from a traveling direction is weakened.

10. A lane recognition apparatus according to claim 5, wherein the time series smoothing means is configured to perform time series smoothing such that a signal of a linear pattern largely deviating from a traveling direction is weakened.

* * * * *